(12) United States Patent
He et al.

(10) Patent No.: US 11,600,825 B2
(45) Date of Patent: Mar. 7, 2023

(54) POSITIVE ELECTRODE FOR SECONDARY LITHIUM METAL BATTERY AND METHOD OF MAKING

(71) Applicant: GM GLOBAL TECHNOLOGY OPERATIONS LLC, Detroit, MI (US)

(72) Inventors: Meinan He, Sterling Heights, MI (US); Biqiong Wang, Madison Heights, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 16/943,726

(22) Filed: Jul. 30, 2020

(65) Prior Publication Data

US 2022/0037668 A1 Feb. 3, 2022

(51) Int. Cl.
| | | |
|---|---|---|
| *H01M 4/66* | (2006.01) | |
| *H01M 4/62* | (2006.01) | |
| *H01M 4/139* | (2010.01) | |
| *H01M 4/36* | (2006.01) | |
| *H01M 10/052* | (2010.01) | |
| *H01M 10/0568* | (2010.01) | |

(Continued)

(52) U.S. Cl.
CPC ......... *H01M 4/667* (2013.01); *H01M 4/0404* (2013.01); *H01M 4/139* (2013.01); *H01M 4/362* (2013.01); *H01M 4/62* (2013.01); *H01M 4/661* (2013.01); *H01M 10/052* (2013.01); *H01M 10/0568* (2013.01); *H01M 2004/021* (2013.01); *H01M 2004/028* (2013.01)

(58) Field of Classification Search
CPC ............ H01M 4/66; H01M 4/62; H01M 4/04; H01M 4/139; H01M 4/36
See application file for complete search history.

(56) References Cited

U.S. PATENT DOCUMENTS 8,974,946 B2  3/2015  Cai et al.
9,160,036 B2  10/2015  Yang et al.
(Continued)

FOREIGN PATENT DOCUMENTS

CN     114068861 A      2/2022
DE  102021106392.2 A1   2/2022

OTHER PUBLICATIONS

Yuki Yamada, Ching Hua Chiang, Keitaro Sodeyama, Jianhui Wang, Yoshitaka Tateyama, and Atsuo Yamada, "Corrosion Prevention Mechanism of Aluminum Metal in Superconcentrated Electrolytes", ChemElectroChem 2015, 2, 1687-1694, 2015 Wiley-VCH Verlag GmbH & Co. KGaA Weinheim.

*Primary Examiner* — Kenneth J Douyette
(74) *Attorney, Agent, or Firm* — Harness, Dickey & Pierce, P.L.C.

(57) ABSTRACT

A positive electrode for an electrochemical cell of a secondary lithium metal battery may include an aluminum metal substrate and a protective layer disposed on a major surface of the aluminum metal substrate. The protective layer may include a conformal aluminum fluoride coating layer. A positive electrode active material layer may overlie the protective layer on the major surface of the aluminum metal substrate. The positive electrode active material layer may include a plurality of interconnected pores, which may be infiltrated with a nonaqueous electrolyte that includes a lithium imide salt.

20 Claims, 1 Drawing Sheet

(51) Int. Cl.
*H01M 4/04* (2006.01)
*H01M 4/02* (2006.01)

(56) References Cited

U.S. PATENT DOCUMENTS

| | | | |
|---|---|---|---|
| 9,252,411 B2 | 2/2016 | Abd Elhamid et al. |
| 9,373,829 B2 | 6/2016 | Xiao et al. |
| 9,742,028 B2 | 8/2017 | Zhou et al. |
| 9,923,189 B2 | 3/2018 | Xiao |
| 9,929,435 B2 | 3/2018 | Cai et al. |
| 9,979,008 B2 | 5/2018 | Dai et al. |
| 10,084,204 B2 | 9/2018 | Dai et al. |
| 10,128,481 B2 | 11/2018 | Xiao et al. |
| 10,199,643 B2 | 2/2019 | Zhou et al. |
| 10,224,571 B2 | 3/2019 | Yang et al. |
| 10,312,501 B2 | 6/2019 | Yang et al. |
| 10,326,166 B2 | 6/2019 | Yang et al. |
| 10,329,982 B2 | 6/2019 | Smith et al. |
| 10,352,253 B2 | 7/2019 | Whitney et al. |
| 10,396,360 B2 | 8/2019 | Xiao et al. |
| 10,431,849 B2 | 10/2019 | Yersak et al. |
| 10,434,894 B2 | 10/2019 | Li et al. |
| 10,446,884 B2 | 10/2019 | Yang et al. |
| 10,476,105 B2 | 11/2019 | Dai et al. |
| 10,483,592 B2 | 11/2019 | Xiao et al. |
| 10,497,927 B2 | 12/2019 | Xiao |
| 10,511,049 B2 | 12/2019 | Yang et al. |
| 10,566,652 B2 | 2/2020 | Dai et al. |
| 10,573,879 B2 | 2/2020 | Yang et al. |
| 10,593,931 B2 | 3/2020 | Adair et al. |
| 10,608,249 B2 | 3/2020 | Liu et al. |
| 10,629,941 B2 | 4/2020 | Dai et al. |
| 10,629,949 B2 | 4/2020 | Yersak et al. |
| 10,673,046 B2 | 6/2020 | Dadheech et al. |
| 10,680,281 B2 | 6/2020 | Yersak et al. |
| 10,707,530 B2 | 7/2020 | Yang et al. |
| 10,734,673 B2 | 8/2020 | Yersak et al. |
| 10,749,214 B2 | 8/2020 | Salvador et al. |
| 10,751,694 B2 | 8/2020 | Dailly et al. |
| 10,797,301 B2 | 10/2020 | Dai et al. |
| 10,797,353 B2 | 10/2020 | Adair et al. |
| 10,814,743 B2 | 10/2020 | Li et al. |
| 10,907,981 B2 | 2/2021 | Li et al. |
| 10,919,112 B2 | 2/2021 | Dai et al. |
| 10,944,096 B2 | 3/2021 | Dai et al. |
| 10,991,946 B2 | 4/2021 | Xiao et al. |
| 10,998,578 B2 | 5/2021 | Dai et al. |
| 11,031,586 B2 | 6/2021 | Chen et al. |
| 11,075,371 B2 | 7/2021 | Li et al. |
| 11,094,996 B2 | 8/2021 | Xiao et al. |
| 11,101,501 B2 | 8/2021 | Liu et al. |
| 11,114,696 B2 | 9/2021 | Yang et al. |
| 11,145,897 B2 | 10/2021 | Dai et al. |
| 11,165,052 B2 | 11/2021 | Xiao et al. |
| 11,183,714 B2 | 11/2021 | Yang et al. |
| 11,217,781 B2 | 1/2022 | Xiao |
| 11,309,539 B2 | 4/2022 | Dai et al. |
| 2014/0234715 A1* | 8/2014 | Fasching ............... H01M 4/139 |
| | | 429/231.95 |
| 2015/0056387 A1 | 2/2015 | Dadheech et al. |
| 2015/0056493 A1 | 2/2015 | Dadheech et al. |
| 2016/0172706 A1 | 6/2016 | Xiao et al. |
| 2016/0172710 A1 | 6/2016 | Liu et al. |
| 2017/0009360 A1* | 1/2017 | Schuh ................... H01M 4/661 |
| 2017/0179532 A1* | 6/2017 | Archer ................... H01M 4/38 |
| 2017/0271678 A1 | 9/2017 | Yang et al. |
| 2018/0151887 A1 | 5/2018 | Yang et al. |
| 2019/0198880 A1* | 6/2019 | Matsushita ......... H01M 4/0404 |
| 2019/0207208 A1 | 7/2019 | Dai et al. |
| 2019/0372155 A1 | 12/2019 | Yersak et al. |
| 2019/0393549 A1 | 12/2019 | Yersak et al. |
| 2020/0212446 A1 | 7/2020 | Xiao et al. |
| 2020/0321617 A1 | 10/2020 | Xiao |
| 2020/0395630 A1 | 12/2020 | Yersak et al. |
| 2021/0111407 A1 | 4/2021 | Li et al. |
| 2021/0159493 A1 | 5/2021 | Xiao et al. |
| 2021/0218048 A1 | 7/2021 | Dai et al. |
| 2021/0257656 A1 | 8/2021 | Yersak |

* cited by examiner

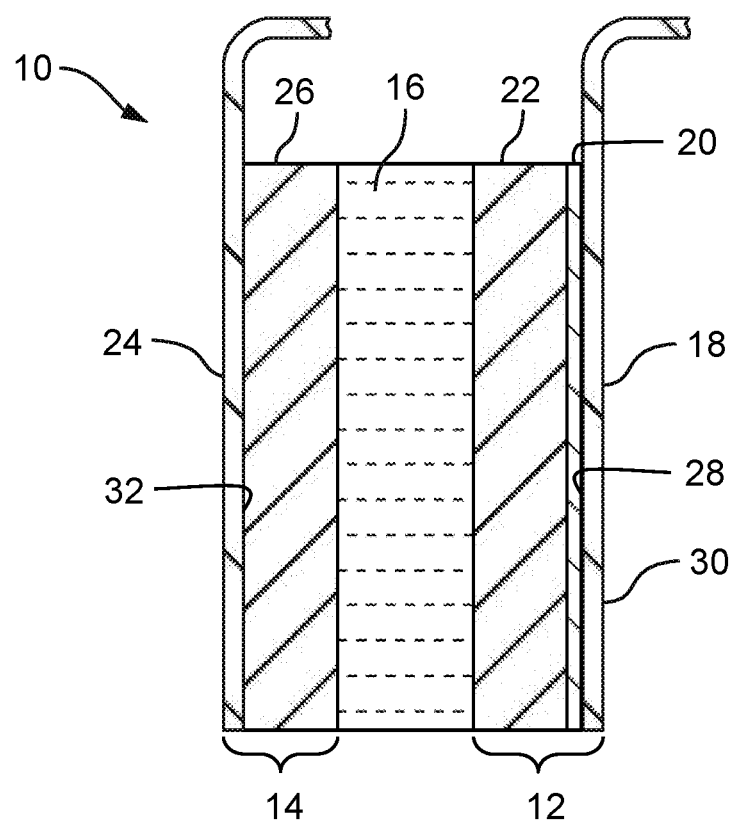

POSITIVE ELECTRODE FOR SECONDARY LITHIUM METAL BATTERY AND METHOD OF MAKING

INTRODUCTION

The present invention relates to secondary lithium metal batteries.

A battery is a device that converts chemical energy into electrical energy via electrochemical reduction-oxidation (redox) reactions. In secondary or rechargeable batteries, these electrochemical reactions are reversible, which allows the batteries to undergo multiple charging and discharging cycles.

Secondary lithium batteries generally comprise one or more electrochemical cells that include a negative electrode, a positive electrode, an electrolyte, a negative current collector, and a positive current collector. Such batteries are powered by the cooperative movement of lithium ions and electrons between the negative and positive electrodes of each electrochemical cell. The electrolyte is ionically conductive and provides a medium for the conduction of lithium ions through the electrochemical cell between the negative and positive electrodes. The current collectors are electrically conductive and allow electrons to simultaneously travel between the negative and positive electrodes via an external circuit. A porous separator may be used to physically separate and electrically insulate the electrodes from each other while permitting free ion flow therebetween.

Lithium metal is a desirable negative electrode material for secondary lithium metal batteries because it has the highest specific capacity (3,860 mAh/g) and the lowest electrochemical potential of any negative electrode material for Li-based batteries (−3.04 V versus the standard hydrogen electrode).

SUMMARY

A positive electrode for an electrochemical cell of a secondary lithium metal battery is disclosed. The positive electrode may include an aluminum metal substrate having a major surface and a protective layer disposed on the major surface of the aluminum metal substrate. The protective layer may comprise a conformal aluminum fluoride coating layer. A positive electrode active material layer may overlie the protective layer on the major surface of the aluminum metal substrate.

The conformal aluminum fluoride coating layer may be chemically bonded to the major surface of the aluminum metal substrate via Al—F bonds.

The protective layer may passivate the major surface of the aluminum metal substrate.

The protective layer may have a thickness in a range of 10 nm to 100 nm.

The positive electrode active material layer may include a plurality of interconnected pores, and the interconnected pores of the positive electrode active material layer may be infiltrated with a nonaqueous electrolyte that comprises a lithium imide salt.

The positive electrode active material layer may be formed directly on a major surface of the protective layer.

The protective layer may be substantially free of carbon.

The conformal aluminum fluoride coating layer may exhibit an amorphous structure.

The conformal aluminum fluoride coating layer may comprise a nonstoichiometric aluminum fluoride compound represented by the chemical formula $AlF_x$, wherein $0.5 \leq x \leq 3$.

An electrochemical cell for a secondary lithium metal battery is disclosed. The electrochemical cell may include a negative electrode, a positive electrode, and a nonaqueous electrolyte in ionic contact with the positive and negative electrodes. The negative electrode may include a metallic substrate having a major surface and a lithium metal layer disposed on the major surface of the metallic substrate. The positive electrode may include an aluminum metal substrate having a major surface and a protective layer disposed on the major surface of the aluminum metal substrate. A positive electrode active material layer may overlie the protective layer on the major surface of the aluminum metal substrate. The protective layer may comprise a conformal aluminum fluoride coating layer. The non-aqueous electrolyte may comprise a lithium imide salt.

The conformal aluminum fluoride coating layer may be chemically bonded to the major surface of the aluminum metal substrate via Al—F bonds.

The lithium imide salt may comprise at least one of lithium bis(trifluoromethanesulfonyl)imide or lithium bis(fluorosulfonyl)imide.

The nonaqueous electrolyte may comprise a nonaqueous, aprotic organic solvent, and the lithium imide salt may be dissolved in the nonaqueous, aprotic organic solvent.

The concentration of the lithium imide salt in the nonaqueous electrolyte is in a range of 0.1 M to 2.0 M.

The positive electrode active material layer may be formed directly on a major surface of the protective layer. The positive electrode active material layer may be electrically coupled to the aluminum metal substrate and ionically coupled to the lithium metal layer via the nonaqueous electrolyte.

The protective layer may passivate the major surface of the aluminum metal substrate and prevent dissolution of $Al^{3+}$ ions from the aluminum metal substrate at operating potentials up to 4.6 V vs. $Li/Li^+$ and at temperatures up to 55° C.

A method of manufacturing a positive electrode for an electrochemical cell of a secondary lithium metal battery is disclosed. In the disclosed method, an aluminum metal substrate may be provided. The aluminum metal substrate may have a major surface. A conformal aluminum fluoride coating layer may be formed directly on the major surface of the aluminum metal substrate. Then, a positive electrode active material layer may be formed on the major surface of the aluminum metal substrate over the conformal aluminum fluoride coating layer.

The method may further include infiltrating the positive electrode active material layer with a nonaqueous liquid electrolyte solution that comprises a lithium imide salt dissolved in a nonaqueous, aprotic organic solvent.

In some embodiments, the conformal aluminum fluoride coating layer may be formed on the major surface of the aluminum metal substrate using an atomic layer deposition process. The atomic layer deposition process may include a first stage and a second stage, which may be sequentially and repeatedly performed at least twice to form the conformal aluminum fluoride coating layer on the major surface of the aluminum metal substrate. In the first stage, the major surface of the aluminum metal substrate may be exposed to a gaseous aluminum halide to form a solid aluminum halide layer on the major surface of the aluminum metal substrate. In the second stage, the solid aluminum halide layer may be exposed to a gaseous metal fluoride to transform the solid aluminum halide layer into a solid aluminum fluoride layer.

In other embodiments, the conformal aluminum fluoride coating layer may be formed on the major surface of the aluminum metal substrate using a wet chemical precipitation process.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein:

FIG. 1 is a schematic side cross-sectional view of an electrochemical cell for a secondary lithium metal battery.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed electrochemical cells may be electrically coupled to one another to form high-performance secondary lithium metal batteries that exhibit high electrochemical (oxidative and reductive) stability and high thermal stability, at relatively high operating potentials (e.g., at relatively high charge voltages of up to 4.6 V vs. Li/Li$^+$) and at temperatures up to 55° C. (e.g., at temperatures in a range of 45° C. to 55° C.). Without intending to be bound by theory, it is believed that the use of a lithium imide salt, instead of lithium hexafluorophosphate (LiPF$_6$), in the nonaqueous electrolytes of such electrochemical cells may help improve the performance of the cells, for example, by increasing the ionic conductivity and improving the thermal stability of the electrolytes and also by improving the capacity retention and long cycling stability of the electrochemical cells. In addition, the ex-situ formation of a nanoscale conformal aluminum fluoride (AlF$_x$) coating layer on the aluminum (Al) current collector of the positive electrode prior to assembly of the electrochemical cells is believed to help reduce or prevent oxidative corrosion of the Al current collector at relatively high operating potentials and at relatively high operating temperatures, and also may help improve the peel strength and capacity retention of the positive electrode. In comparison to electrochemical cells that do not include an AlF$_x$ coating layer on their Al current collectors, the presently disclosed electrochemical cells have been found to exhibit a higher sustained Coulombic efficiency and higher capacity retention over the cycle life of the electrochemical cells.

Furthermore, formation of an AlF$_x$ coating layer on the Al current collectors of the presently disclosed electrochemical cells may eliminate the need for addition of anticorrosion additives in the electrolytes. For example, compounds of LiPF$_6$, LiBF$_4$, LiClO$_4$, LiBOB, LiDFOB, LiTDI, and/or LTFOP have previously been added to nonaqueous electrolytes of lithium metal batteries to inhibit corrosion of the Al current collectors. However, without intending to be bound by theory, it is believed that the inclusion of such compounds in the nonaqueous electrolytes may reduce the cycling stability of the electrochemical cells, for example, by adversely impacting the structure and/or plating and stripping behavior of the lithium metal negative electrode, by consuming active Li$^+$ ions in the electrochemical cell, and/or by taking part in adverse side-reactions with other components of the cells.

Those of ordinary skill in the art understand that the term "conformal," when used to describe a coating, refers to a coating in which the material of the coating physically matches or conforms to the shape and contour of the surface being coated and does not substantially change shape or contour thereof. For example, as used herein, the AlF$_x$ coating layer is applied to the surface of the Al current collector such that the AlF$_x$ coating layer conforms to the shape and contour thereof.

FIG. 1 illustrates in idealized fashion a cross-sectional view of an electrochemical cell 10 of a secondary lithium metal battery (not shown). The electrochemical cell 10 comprises a positive electrode 12, a negative electrode 14, and a nonaqueous electrolyte 16 in ionic contact with the positive electrode 12 and the negative electrode 14. The positive electrode 14 includes a positive current collector 18 having a protective layer 20 formed thereon, and a positive electrode active material layer 22 overlying the protective layer 20 on the positive current collector 18. The negative electrode 14 includes a negative current collector 24 and a negative electrode active material layer in the form of a lithium metal layer 26 formed on the negative current collector 24. The positive and negative electrodes 12, 14 are spaced apart from one another and, in assembly, may be physically separated from one another by a porous separator (not shown). In assembly, the positive electrode 12 may be electrically coupled to the negative electrode 14 via an external circuit (not shown) so that electrons can flow between the positive and negative electrodes 12, 14 while lithium ions simultaneously travel through the nonaqueous electrolyte 16 between the lithium metal layer 26 and the opposing positive electrode active material layer 22 during cycling of the electrochemical cell 10.

The nonaqueous electrolyte 16 is formulated to rapidly and effectively conduct lithium ions (Li$^+$) between the positive and negative electrodes 12, 14 and to minimize the occurrence of undesirable side reactions between the constituents of the electrolyte 16 and the other components of the electrochemical cell 10 over the range of operating potentials and temperatures experienced by the electrochemical cell 10. The inventors of the present disclosure have discovered that the use of lithium imide salts in the nonaqueous electrolyte 16 may enable the rapid and effective conduction of Li$^+$ ions between the positive and negative electrodes 12, 14 of the electrochemical cell 10, while also improving the hydrolytic, thermal, and electrochemical stability of the electrolyte 16 (as compared to electrolytes that include LiPF$_6$ salts). For example, unlike LiPF$_6$, the presently disclosed lithium imide salts do not react with trace amounts of water in the electrolyte 16 to form hydrogen fluoride (HF) compounds.

In some embodiments, the nonaqueous electrolyte 16 may comprise a nonaqueous liquid electrolyte. In such case, the electrolyte 16 may comprise a solution including one or more lithium imide salts dissolved or ionized in a nonaqueous, aprotic organic solvent, which may comprise an organic solvent or a mixture of organic solvents. The nonaqueous, aprotic organic solvent may comprise a cyclic carbonate (i.e., ethylene carbonate, propylene carbonate, fluoroethylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture thereof. The concentration of the one or more lithium imide salts in the electrolyte 16 may be in a range of 0.1 M to 2.0 M.

In some embodiments, the electrolyte 16 may comprise a gel or plasticized polymer electrolyte. In such case, the electrolyte 16 may comprise a polymer host material soaked with a liquid electrolyte solution. Examples of polymer host materials include poly(vinylidene) fluoride (PVdF), poly (acrylonitrile) (PAN), poly(methyl methacrylate) (PMMA), poly(ethylene oxide) (PEO), polyacrylates, and poly(vinylidene fluoride-hexafluoropropylene) (PVdF-HFP).

In some embodiments, the electrolyte 16 may be substantially free of one or more of the following lithium salts: lithium hexafluorophosphate ($LiPF_6$), lithium tetrafluoroborate ($LiBF_4$), lithium perchlorate ($LiClO_4$), and combinations thereof. For example, the lithium salts of $LiPF_6$, $LiBF_4$, and/or $LiClO_4$ may comprise, by weight, less than 5%, preferably less than 3%, and more preferably less than 1% of the electrolyte 16.

In some embodiments, the electrolyte 16 may be substantially free of one or more of the following electrolyte additives: lithium bis(oxalato)borate (LiBOB), lithium difluoro(oxalato)b orate (LiDFOB), lithium 2-trifluoromethyl-4,5-dicyanoimidazole (LiTDI), and/or lithium tetrafluoro (oxalato) phosphate (LTFOP). For example, the electrolyte additives of LiBOB, LiDFOB, LiTDI, and/or LTFOP may comprise, by weight, less than 5%, preferably less than 3%, and more preferably less than 1% of the electrolyte 16.

When present, the porous separator disposed between the positive and negative electrodes 12, 14 may comprise any material that can physically separate and electrically insulate the electrodes 12, 14 from one another while permitting the free flow of lithium ions therebetween. For example, the porous separator may comprise non-woven materials or microporous polymeric materials. In particular, the porous separator may comprise a single polyolefin or a combination of polyolefins, such as polyethylene (PE), polypropylene (PP), polyamide (PA), poly(tetrafluoroethylene) (PTFE), poly(vinylidene) fluoride (PVdF), and/or poly(vinyl chloride) (PVC). In one form, the porous separator may comprise a laminate of one or more polymeric materials, such as a laminate of PE and PP.

The positive current collector 18 is electrically coupled to the positive electrode active material layer 22 and is configured to collect and reversibly transfer free electrons to and from the positive electrode active material layer 22. The positive current collector 18 may comprise an aluminum metal substrate having a first major surface 28 and an opposite second major surface 30. The aluminum metal substrate of the positive current collector 18 may be in the form of a thin and flexible non-porous aluminum metal foil, a porous aluminum metal mesh, or a perforated aluminum metal sheet. The aluminum metal substrate may be made of an aluminum-based material, which may consist of pure aluminum (Al) or an alloy of aluminum and at least one other metal or nonmetal (alloying element). In embodiments where the aluminum-based material comprises an aluminum alloy, the aluminum alloy may comprise, by weight, >90% aluminum, preferably ≥95% aluminum, and more preferably ≥98% aluminum. Other metal or nonmetal elements unintentionally may be present, for example, as impurities, in the aluminum-based material in relatively small amounts, e.g., less than 5%, preferably less than 3%, and more preferably less than 0.2% by weight of the aluminum-based material. In some embodiments, the aluminum metal substrate of the positive current collector 18 may comprise a conformal aluminum oxide ($Al_2O_3$) layer that defines an external surface thereof. The aluminum metal substrate of the positive current collector 18 may have a thickness in the range of 8 micrometers to 20 micrometers.

The protective layer 20 is formed directly on the first major surface 28 of the aluminum metal substrate of the positive current collector 18 and is configured to passivate the first major surface 28 of the aluminum metal substrate and to provide a protective interface between the aluminum metal substrate and the electrolyte 16 by preventing physical contact and undesirable chemical reactions between the aluminum metal substrate and the electrolyte 16, while allowing electrons to effectively pass therethrough. The term "passivate," as used herein, refers to the formation of a coating layer overlying the surface 28 (or surfaces 28, 30) of the aluminum metal substrate that makes the surface 28 (or surfaces 28, 30) of the aluminum metal substrate less reactive with the electrolyte 16. When used in connection with the protective layer 20, the term "passivate" refers to a coating layer that is not intrinsically formed on the aluminum metal substrate and is not formed in situ on the aluminum metal substrate during any number of discharge and/or recharge cycles of the electrochemical cell 10. Without intending to be bound by theory, it is believed that the protective layer 20 effectively passivates the surface 28 (or surfaces 28, 30) of the aluminum metal substrate of the positive current collector 18 by preventing the dissociation and dissolution of $Al^{3+}$ ions from the positive current collector 18 into the electrolyte 16.

The protective layer 20 may comprise a conformal coating layer of solid aluminum fluoride, which may be chemically bonded to the aluminum metal substrate via formation of Al—F bonds. The aluminum fluoride coating layer may comprise a material having Al—F bonds with various stoichiometries and also may exhibit an amorphous structure. For example, the composition of the aluminum fluoride coating layer may be represented by the chemical formula $AlF_x$, wherein $0.5 \leq x \leq 3$. In one form, the aluminum fluoride coating layer may comprise or may consist essentially of $AlF_3$. Other fluorine-containing compounds also may be present in the aluminum fluoride coating layer in relatively small amounts. For example, in some embodiments, the protective layer 20 also may comprise lithium fluoride (LiF) and/or lithium aluminum fluoride ($Li_xAl_yF$). These fluorine-containing compounds may be present in the protective layer 20 in amounts, by weight, constituting, by weight, less than 20%, preferably less than 10%, and more preferably less than 5% of the protective layer 20. The protective layer 20 may have a thickness in the range of 10 nanometers to 100 nanometers.

The protective layer 20 may effectively passivate the first major surface 28 of the aluminum metal substrate, and thus may eliminate the need for a carbon-based coating on the first major surface 28 of the aluminum metal substrate, which has previously been employed in lithium metal batteries to prevent oxidative corrosion of the aluminum metal substrate. As such, the protective layer 20 of the electrochemical cell 10 may be substantially free of carbon (C), and thus may include, by weight, less than 1%, preferably less than 0.5%, and more preferably less than 0.01% carbon.

In FIG. 1, a single protective layer 20 is formed on the first major surface 28 of the aluminum metal substrate of the positive current collector 18. In other embodiments, for example, where the positive current collector 18 is sandwiched between the positive electrode active material layer 22 overlying the first major surface 28 of the aluminum metal substrate and a second positive electrode active material layer (not shown) overlying the second major surface 30 of the aluminum metal substrate, a second protective layer (not shown) likewise may be formed on the second major surface 30 of the aluminum metal substrate.

The protective layer 20 may be formed by any suitable method that results in the formation of a nanoscale conformal aluminum fluoride coating layer on the first major surface 28 (and optionally the second major surface 30) of the aluminum metal substrate that exhibits a strong mechanical and/or chemical bond with the aluminum metal substrate. In some embodiments, the protective layer 20 may be formed on one or both of the surfaces 28, 30 of the aluminum metal substrate using an atomic layer deposition process, which may involve repeatedly and sequentially exposing the aluminum metal substrate to a gaseous aluminum halide, e.g., aluminum chloride ($AlCl_3$), and then exposing the aluminum metal substrate to a gaseous metal fluoride, e.g., titanium fluoride ($TiF_4$). For example, in a first stage of the atomic layer deposition process, the aluminum metal substrate may be exposed to a gaseous aluminum halide such that the aluminum halide is adsorbed on the surface of the aluminum metal substrate and forms a solid conformal layer of the aluminum halide on one or both of the surfaces 28, 30 of the aluminum metal substrate. Thereafter, in a second stage of the atomic layer deposition process, the aluminum halide layer may be exposed to a gaseous metal fluoride to transform the aluminum halide layer into a solid conformal layer of aluminum fluoride (e.g., $AlF_3$) on one or both of the surfaces 28, 30 of the aluminum metal substrate. A gaseous metal halide may be released as a chemical reaction by-product of the second stage of the atomic layer deposition process. Taken together, the first and second stages of the atomic layer deposition process may constitute a single cycle of the atomic layer deposition process, and such cycle may be repeatedly and sequentially performed to build-up a conformal aluminum fluoride coating layer on the aluminum metal substrate that exhibits a desired thickness. For example, in some embodiments, the first and second stages of the atomic layer deposition process may be sequentially and repeatedly performed for a total of 2 to 500 cycles. The atomic layer deposition process may be performed in an inert oxygen-free environment (e.g., Ar and/or $N_2$ gas) at a temperature in the range of 150° C. to 450° C. and at a pressure in the range of 0.01 pascals to 100 pascals. Each stage of the atomic layer deposition process may be performed by "pulsing" or exposing the aluminum metal substrate to the gaseous aluminum halide or the gaseous metal fluoride for a duration in the range of 0.5 second to 10 seconds. Between each "pulse" of the gaseous aluminum halide or the gaseous metal fluoride, the reaction chamber in which the atomic layer deposition process is performed may be purged of the gaseous aluminum halide or the gaseous metal fluoride prior to initiating the next stage of the process.

In other embodiments, the protective layer 20 may be formed on one or both of the surfaces 28, 30 of the aluminum metal substrate using a wet chemical precipitation process. In such case, the aluminum metal substrate may be submerged in a first aqueous solution of aluminum nitrate dehydrate ($Al(NO_3)_3$) having a pH of 7.0 and a temperature in a range of 25° C. to less than 100° C. Thereafter, a second aqueous solution of ammonium fluoride ($NH_4F$) may be added to the first aqueous solution to achieve an Al:F molar ratio of 1:3. The amount of Al and F in the mixture of the first and second aqueous solutions may comprise, by weight, 2% to 15% of the aluminum metal substrate. Thereafter, the solvent (i.e., water) and the chemical reaction by-products (e.g., $NH_4NO_3$) are evaporated therefrom by heating at a temperature in the range of 50° C. to 100° C., for example, under vacuum. Then, the final conformal aluminum fluoride coating layer is formed on the aluminum metal substrate by annealing the substrate in an inert oxygen-free environment (e.g., Ar and/or $N_2$ gas) at a temperature in the range of 300° C. to 500° C., e.g., about 400° C. The thickness of the resulting aluminum fluoride coating layer may be controlled or adjusted by suitable control of the concentration of Al and F in the mixture of the first and second aqueous solutions, the temperature of the mixture of the first and second aqueous solutions, the duration of exposure of the aluminum metal substrate to the mixture of the first and second aqueous solutions, and/or the annealing temperature.

The positive electrode active material layer 22 is carried by the positive current collector 18 and overlies the protective layer 20 on the first major surface 28 of the positive current collector 18. The positive electrode active material layer 22 is porous and includes a plurality of interconnected open pores. In assembly, the pores of the positive electrode active material layer 22 are infiltrated or impregnated with the electrolyte 16. For example, the positive electrode active material layer 22 may exhibit a porosity in the range of 20% to 30%. In some embodiments, the positive electrode active material layer 22 may have a thickness in a range of 50 micrometers to 200 micrometers.

The positive electrode active material layer 22 may comprise one or more electrochemically active materials that can undergo a reversible redox reaction with lithium at a higher electrochemical potential than lithium metal such that an electrochemical potential difference exists between the positive electrode active material layer 22 and the lithium metal layer 26. In one form, the positive electrode active material layer 22 may comprise an intercalation host material that can undergo the reversible insertion or intercalation of lithium ions. In such case, the intercalation host material of the positive electrode active material layer 22 may comprise a layered oxide represented by the formula $LiMeO_2$, an olivine-type oxide represented by the formula $LiMePO_4$, a spinel-type oxide represented by the formula $LiMe_2O_4$, a tavorite represented by one or both of the following formulas $LiMeSO_4F$ or $LiMePO_4F$, or a combination thereof, where Me is a transition metal (e.g., Co, Ni, Mn, Fe, Al, V, or a combination thereof). For example, the intercalation host material may comprise a layered lithium transition metal oxide, such as lithium cobalt oxide ($LiCoO_2$) and lithium-nickel-manganese-cobalt oxide [$Li(Ni_xMn_yCo_z)O_2$], a spinel lithium transition metal oxide, such as spinel lithium manganese oxide ($LiMn_2O_4$), lithium iron phosphate ($LiFePO_4$), or lithium fluorophosphate ($Li_2FePO_4F$), lithium nickel oxide ($LiNiO_2$), lithium aluminum manganese oxide ($Li_xAl_yMn_{1-y}O_2$), lithium vanadium oxide ($LiV_2O_5$), or a combination thereof. In another form, the positive electrode active material layer 22 may comprise a conversion material including a component that can undergo a reversible electrochemical reaction with lithium, in which the component undergoes a phase change or a change in crystalline structure accompanied by a change in oxidation state. In such case, the conversion material of the positive electrode active material layer 22 may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of suitable metals for inclusion in the conversion material of the positive electrode active material layer 22 include iron, manganese, nickel, copper, and cobalt. The electrochemically active material of the positive electrode active material layer 22 may be intermingled with a polymeric binder material to provide the positive electrode active material layer 22 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The positive electrode active material layer 22 optionally may include particles of an electrically conductive material, which may comprise very fine particles of, for example, high-surface area carbon black.

The positive electrode active material layer 22 may be formed on the first major surface 28 of the positive current collector 18 after formation of the protective layer 20. Formation of the positive electrode active material layer 22 may include preparation of a slurry that includes particles of the one or more electrochemically active materials and optionally the polymeric binder material and/or the electrically conductive material suspended or dispersed within a solvent. The slurry may be applied to the first major surface 28 of the positive current collector 18 over the protective layer 20 and then dried to evaporate the solvent and form the positive electrode active material layer 22.

The negative current collector 24 may be in the form of a thin and flexible porous or non-porous electrically conductive metallic substrate and may comprise any metallic material that is capable of collecting and reversibly passing free electrons to and from the lithium metal layer 26. The term "metallic," as used herein refers to a material that predominantly comprises one or more metals. As such, a metallic material may comprise a single metal, more than one metal (in alloy form or otherwise), or both one or more metals and one or more other non-metal components in elemental or compound form. For example, the negative current collector 24 may comprise an electrically conductive metal or metal alloy, e.g., a transition metal or an alloy thereof. In some embodiments, the negative current collector 24 may comprise copper (Cu), nickel (Ni), an iron (Fe) alloy (e.g., stainless steel), or titanium (Ti). Other electrically conductive metals may of course be used, if desired.

The lithium metal layer 26 may be physically bonded to a major surface 32 of the negative current collector 24. The lithium metal layer 26 may comprise a lithium metal alloy or may consist essentially of lithium (Li) metal. For example, the lithium metal layer 26 may comprise, by weight, greater than 97% lithium or, more preferably, greater than 99% lithium. As such, the lithium metal layer 26 preferably does not comprise any other elements or compounds that undergo a reversible redox reaction with lithium during operation of the electrochemical cell 10. For example, the lithium metal layer 26 preferably does not comprise an intercalation host material that is formulated to undergo the reversible insertion or intercalation of lithium ions or an alloying material that can electrochemically alloy and form compound phases with lithium. In addition, the lithium metal layer 26 preferably does not comprise a conversion material or an alloy material that can electrochemically alloy and form compound phases with lithium. Examples of materials that are preferably excluded from the lithium metal layer 26 of the present disclosure include carbon-based materials (e.g., graphite, activated carbon, carbon black, and graphene), silicon and silicon-based materials, tin oxide, aluminum, indium, zinc, cadmium, lead, germanium, tin, antimony, titanium oxide, lithium titanium oxide, lithium titanate, lithium oxide, metal oxides (e.g., iron oxide, cobalt oxide, manganese oxide, copper oxide, nickel oxide, chromium oxide, ruthenium oxide, and/or molybdenum oxide), metal phosphides, metal sulfides, and metal nitrides (e.g., phosphides, sulfides, and/or nitrides or iron, manganese, nickel, copper, and/or cobalt). In addition, the lithium metal layer 26 preferably does not comprise a polymeric binder. Examples of polymeric binders that are preferably excluded from the lithium metal layer 26 of the present disclosure include polyvinylidene fluoride (PVdF), ethylene propylene diene monomer (EPDM) rubber, styrene butadiene rubber (SBR), carboxymethyl cellulose (CMC), and polyacrylic acid. The lithium metal layer 26 may have a thickness in the range of 5 micrometers to 600 micrometers.

After the protective layer 20 and the positive electrode active material layer 22 are formed on the first major surface 28 of the positive current collector 18 and the lithium metal layer 26 is formed on the major surface 32 of the negative current collector 24, the electrochemical cell 10 may be assembled. The electrochemical cell 10 may be assembled, for example, by positioning the positive and negative electrodes 12, 14 in a spaced apart relationship, wetting the opposing surfaces of the positive and negative electrodes 12, 14 with the electrolyte 16, and electrically coupling the positive and negative electrodes 12, 14 to each other via an external circuit.

The ex situ formation of the protective layer 20 on the major surface 28 of the positive current collector 18 prior to assembly of the electrochemical cell 10 effectively passivates the major surface 28 of the aluminum metal substrate of the positive current collector 18, and thus may eliminate the need for addition of anticorrosion additives in the electrolyte 16. These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A positive electrode for an electrochemical cell of a secondary lithium metal battery, the positive electrode including:
   an aluminum metal substrate having a major surface;
   a protective layer formed ex situ on the major surface of the aluminum metal substrate;
   a positive electrode active material layer overlying the protective layer on the major surface of the aluminum metal substrate, the positive electrode active material layer comprising a plurality of interconnected pores; and
   a nonaqueous electrolyte consisting essentially of a lithium imide salt dissolved in a nonaqueous, aprotic organic solvent, the nonaqueous electrolyte infiltrating the interconnected pores of the positive electrode active material layer, wherein the protective layer comprises a conformal aluminum fluoride coating layer, and wherein the nonaqueous electrolyte is substantially free of $LiPF_6$.

2. The positive electrode of claim 1 wherein the conformal aluminum fluoride coating layer is chemically bonded to the major surface of the aluminum metal substrate via Al—F bonds.

3. The positive electrode of claim 1 wherein the protective layer passivates the major surface of the aluminum metal substrate.

4. The positive electrode of claim 1 wherein the protective layer has a thickness in a range of 10 nm to 100 nm.

5. The positive electrode of claim 1 wherein the positive electrode active material layer is formed directly on a major surface of the protective layer.

6. The positive electrode of claim 1 wherein the protective layer is substantially free of carbon.

7. The positive electrode of claim 1 wherein the conformal aluminum fluoride coating layer exhibits an amorphous structure.

8. The positive electrode of claim 1 wherein the conformal aluminum fluoride coating layer comprises a nonstoichiometric aluminum fluoride compound represented by the chemical formula $AlF_x$, wherein $0.5 \leq x \leq 3$.

9. The positive electrode of claim 1 wherein the lithium imide salt comprises lithium bis(trifluoromethanesulfonyl) imide.

10. The positive electrode of claim 1 wherein the lithium imide salt comprises lithium bis(fluorosulfonyl)imide.

11. An electrochemical cell for a secondary lithium metal battery, the electrochemical cell including:
a negative electrode including: a metallic substrate having a major surface and a lithium metal layer disposed on the major surface of the metallic substrate;
a positive electrode including: an aluminum metal substrate having a major surface, a protective layer formed ex situ on the major surface of the aluminum metal substrate, and a positive electrode active material layer overlying the protective layer on the major surface of the aluminum metal substrate; and
a nonaqueous electrolyte in ionic contact with the positive electrode and with the negative electrode,
wherein the protective layer comprises a conformal aluminum fluoride coating layer,
wherein the non-aqueous electrolyte consists essentially of a lithium imide salt dissolved in a nonaqueous, aprotic organic solvent, and
wherein the nonaqueous electrolyte is substantially free of $LiPF_6$.

12. The electrochemical cell of claim 11 wherein the conformal aluminum fluoride coating layer is chemically bonded to the major surface of the aluminum metal substrate via Al—F bonds.

13. The electrochemical cell of claim 11 wherein the lithium imide salt comprises lithium bis(trifluoromethanesulfonyl)imide.

14. The electrochemical cell of claim 11 wherein a concentration of the lithium imide salt in the nonaqueous electrolyte is in a range of 0.1 M to 2.0 M.

15. The electrochemical cell of claim 11 wherein the positive electrode active material layer is formed directly on a major surface of the protective layer, wherein the positive electrode active material layer is electrically coupled to the aluminum metal substrate, and wherein the positive electrode active material layer is ionically coupled to the lithium metal layer via the nonaqueous electrolyte.

16. The electrochemical cell of claim 11 wherein the protective layer passivates the major surface of the aluminum metal substrate and prevents dissolution of $Al^{3+}$ ions from the aluminum metal substrate at operating potentials up to 4.6 V vs. $Li/Li^+$ and at temperatures up to 55° C.

17. The electrochemical cell of claim 11 wherein the lithium imide salt comprises lithium bis(fluorosulfonyl) imide.

18. A method of manufacturing a positive electrode for an electrochemical cell of a secondary lithium metal battery, the method including:
providing an aluminum metal substrate having a major surface;
forming a conformal aluminum fluoride coating layer directly on the major surface of the aluminum metal substrate;
forming a positive electrode active material layer on the major surface of the aluminum metal substrate over the conformal aluminum fluoride coating layer; and then
infiltrating the positive electrode active material layer with a nonaqueous liquid electrolyte solution consisting essentially of a lithium imide salt dissolved in a nonaqueous, aprotic organic solvent,
wherein the nonaqueous electrolyte is substantially free of $LiPF_6$.

19. The method of claim 18 wherein the conformal aluminum fluoride coating layer is formed on the major surface of the aluminum metal substrate using an atomic layer deposition process that includes:
(i) a first stage, wherein the major surface of the aluminum metal substrate is exposed to a gaseous aluminum halide to form a solid aluminum halide layer on the major surface of the aluminum metal substrate; and
(ii) a second stage, wherein the solid aluminum halide layer is exposed to a gaseous metal fluoride to transform the solid aluminum halide layer into a solid aluminum fluoride layer,
wherein the first and second stages of the atomic layer deposition process are sequentially and repeatedly performed at least twice to form the conformal aluminum fluoride coating layer on the major surface of the aluminum metal substrate.

20. The method of claim 18 wherein the conformal aluminum fluoride coating layer is formed on the major surface of the aluminum metal substrate using a wet chemical precipitation process.

* * * * *